No. 795,699. PATENTED JULY 25, 1905.
C. J. HAYNIE.
COMBINED CULTIVATOR AND COTTON CHOPPER.
APPLICATION FILED OCT. 15, 1904.

Witnesses
Phil E. Barnes.
W. H. Clarke.

Inventor
Charles Jackson Haynie

By Victor J. Evans
Attorney

UNITED STATES PATENT OFFICE.

CHARLES JACKSON HAYNIE, OF MORELAND, GEORGIA.

COMBINED CULTIVATOR AND COTTON-CHOPPER.

No. 795,699.             Specification of Letters Patent.             Patented July 25, 1905.

Application filed October 15, 1904. Serial No. 228,580.

*To all whom it may concern:*

Be it known that I, CHARLES JACKSON HAYNIE, a citizen of the United States, residing at Moreland, in the county of Coweta and State of Georgia, have invented new and useful Improvements in a Combined Cultivator and Cotton-Chopper, of which the following is a specification.

This invention relates to combined cultivators and cotton-choppers.

The objects of the invention are to improve, simplify, and strengthen the construction of such devices; furthermore, to increase their efficiency in operation.

With the foregoing and other minor objects in view, which will appear as the description proceeds, the invention resides in the combination and arrangement of parts and in the details of construction hereinafter described and claimed as a practical embodiment thereof.

Figure 1:
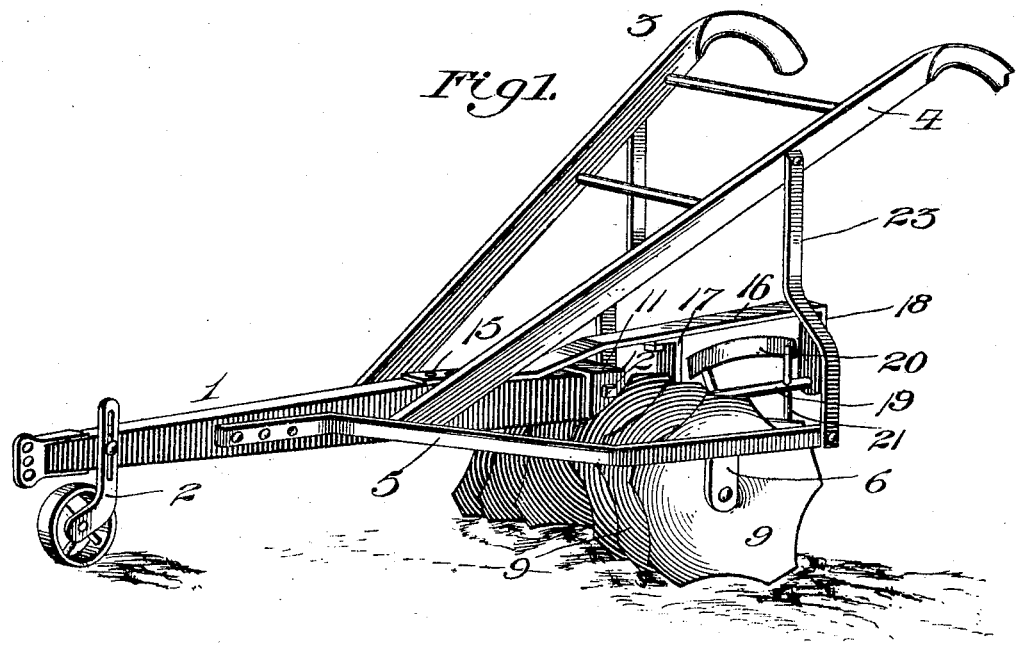
Figure 2:
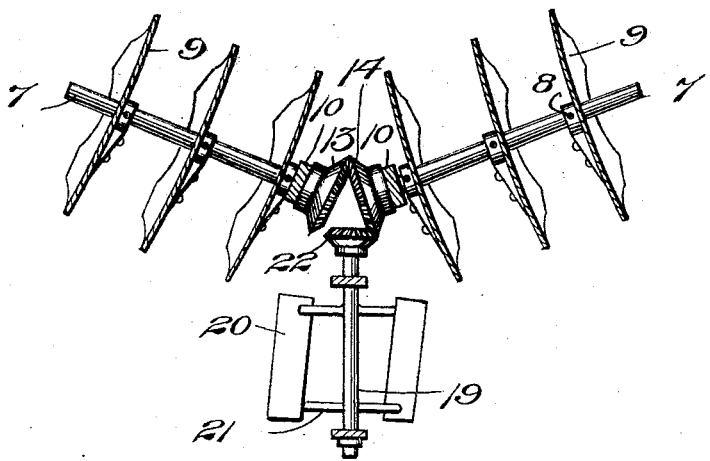

In the accompanying drawings, forming part of this specification, Figure 1 is a perspective view of a combined cultivator and cotton-chopper constructed in accordance with the invention. Fig. 2 is a horizontal section through the cultivator-disks.

Similar numerals of reference indicate corresponding parts in the different views.

The frame of the machine may be of any suitable form and construction, comprising, preferably, a beam 1, having an adjustable guide-wheel 2 and handles 3 and 4. Attached to opposite sides of the beam 1 and extending outwardly and rearwardly therefrom are supporting-braces 5, having depending arms 6, in which are journaled the outer ends of axles 7, having rigidly secured thereto, by means of set-screws 8, a plurality of cultivator-disks 9. The inner ends of the axles 7 are journaled in depending arms 10, which are formed integral with a saddle-piece 11, extending over the beam 1 and secured thereto by means of a bolt 12. The axles 7 are disposed at an acute angle with respect to each other, as shown in Fig. 3, and are provided with bevel-gears 13 and 14, which are in mesh with each other.

Detachably secured to the rear end of the beam 1 by means of bolts 15 is a frame comprising a bar 16, having depending arms 17 and 18, between which is journaled a cotton-chopping device comprising a shaft 19, having cutting-blades 20 secured thereto by means of lateral arms 21. The shaft 19 is provided at its forward end with a bevel-gear 22, which is in mesh with the bevel-gear 14.

The outer ends of the supporting-braces 5 are strengthened by means of braces 23, which are connected at their upper ends to the handles 3 and 4.

From the foregoing description, in connection with the drawings, it will be apparent that the cultivator-disks 9 serve not only to support the frame of the improved machine, but also to transmit rotation to the cotton-chopping device.

By gearing the two axles 7 together and placing the cotton-chopping device in mesh with one of said axles the power of both axles is utilized, whereby a stronger rotation of the cotton-chopping device is secured.

In the event that it be desired to use the device merely as a cultivator the bolts 15 may be loosened and the cotton-chopping device detached entirely from the beam 1.

The cultivator-disks 9 preferably are formed with irregular peripheries, as shown in Fig. 1, in order to insure their rotation as the cultivator is drawn along the row of cotton-plants.

Changes in the precise embodiment of invention illustrated and described may be made within the scope of the following claims without departing from the spirit of the invention or sacrificing any of its advantages.

Having thus described the invention, what is claimed is—

1. In a combined cotton-chopper and cultivator, the combination of a frame having axles arranged at an angle with respect to each other and having bevel-gears on their meeting ends in mesh with each other, cultivator-disks on said axles, and a cotton-chopping device having a bevel-gear located between the meeting ends of said axles and intermeshed with the bevel-gear of one of said axles.

2. In a combined cotton-chopper and cultivator, the combination of a beam, handles secured thereto, supporting-braces attached to opposite sides of said beam and extending outwardly and rearwardly therefrom, depending arms on said supporting-braces, axles journaled in said depending arms, and being arranged at an obtuse angle with respect to each other, bevel-gears on said axles in mesh with each other, cultivator-disks having irregular peripheries on said axles, a frame detachably secured to said beam and having depending arms, and a cotton-chopping device journaled in said depending arms and having a bevel-gear at its forward end meshing with the bevel-gear on one of said axles.

In testimony whereof I affix my signature in presence of two witnesses.

CHAS. JACKSON HAYNIE.

Witnesses:
 ALVAN D. FREEMAN,
 I. N. ORR, JR.